(12) United States Patent
Kobayashi et al.

(10) Patent No.: US 7,857,341 B2
(45) Date of Patent: Dec. 28, 2010

(54) MOTORCYCLE

(75) Inventors: Yuuta Kobayashi, Iwata (JP); Tetsuya Hanai, Iwata (JP)

(73) Assignee: Yamaha Hatsudoki Kabushiki Kaisha, Shizuoka-Ken (JP)

( * ) Notice: Subject to any disclaimer, the term of this patent is extended or adjusted under 35 U.S.C. 154(b) by 181 days.

(21) Appl. No.: 12/260,831

(22) Filed: Oct. 29, 2008

(65) Prior Publication Data

US 2009/0107751 A1 Apr. 30, 2009

(30) Foreign Application Priority Data

Oct. 31, 2007 (JP) ............................. 2007-284224

(51) Int. Cl.
*B62K 11/14* (2006.01)
(52) U.S. Cl. .................................... 280/304.5; 180/219
(58) Field of Classification Search ................. 180/219; 280/304.5
See application file for complete search history.

(56) References Cited

U.S. PATENT DOCUMENTS

| | | | |
|---|---|---|---|
| 5,094,315 A * | 3/1992 | Taki et al. ................... 180/219 |
| 6,336,579 B1 * | 1/2002 | Sako .......................... 224/413 |
| 6,588,529 B2 * | 7/2003 | Ishii et al. ................... 180/219 |
| 7,322,725 B2 * | 1/2008 | Worakasemsuk et al. .... 362/473 |
| 7,651,112 B2 * | 1/2010 | Ozawa ...................... 280/304.5 |
| 2007/0023214 A1 * | 2/2007 | Ishida et al. ................ 180/68.3 |
| 2007/0089922 A1 * | 4/2007 | Iwasaki ...................... 180/219 |
| 2007/0216132 A1 * | 9/2007 | Ozawa ...................... 280/304.5 |

FOREIGN PATENT DOCUMENTS

| JP | 10-236358 | 9/1998 |
|---|---|---|
| WO | WO 2005/002954 A1 | 1/2005 |

* cited by examiner

*Primary Examiner*—Lesley Morris
*Assistant Examiner*—Michael R Stabley
(74) *Attorney, Agent, or Firm*—Haynes and Boone, LLP

(57) ABSTRACT

To prevent damage, for example, to a rear side cover that covers a seat rail from outward in a vehicle width direction, a motorcycle is disclosed having a glove bar fixed to seat rails and configured to be grasped by a fellow passenger seated on a seat. The glove bar may include a support portion fixed to the seat rails to extend outward in a motorcycle width direction and above rear side covers, grips supported by the support portion to extend rearwardly of the seat and configured to be grasped by the fellow passenger, and protective bar portions of a cantilevered structure supported by portions of the support portion positioned above the rear side cover and passing above the rear side covers to extend forward in the motorcycle width direction to protect the rear side covers.

13 Claims, 10 Drawing Sheets

MOTORCYCLE

CROSS-REFERENCE TO RELATED APPLICATIONS

This application is related to and claims priority to Japanese Patent Application No. 2007-284224, filed on Oct. 31, 2007, the entire contents of which is incorporated herein by reference in its entirety.

TECHNICAL FIELD

The present invention relates generally to motorcycles and more particularly for example to shapes of a rear side cover arranged on a rear portion of a motorcycle and a glove bar grasped by a fellow passenger.

BACKGROUND

Motorcycles having a pair of body frames extending in a longitudinal direction of a vehicle and a seat, for a fellow passenger, arranged on the body frames are known. For example, International (PCT) Patent Publication No. 2005/002954 discloses rear side covers that cover both body frames from outward in a vehicle width direction in order to improve a vehicle in appearance and style, the rear side covers being formed to project outward in the vehicle width direction.

However, a disadvantage with such rear side covers projecting outward is that they are susceptible to damage upon collision against a passenger and other things.

SUMMARY

The present invention, in accordance with one or more embodiments, is directed to such problems as described above and may provide a motorcycle capable of preventing damage to rear side covers.

In accordance with an embodiment of the present invention, a motorcycle includes a pair of body frames extending in a longitudinal direction of a vehicle, a fellow passenger seat arranged on the pair of body frames, a rear side cover that covers either of the body frames from outward in a vehicle width direction, and a glove bar fixed to at least either one of the body frames and grasped by a fellow passenger seated on the fellow passenger seat. The glove bar comprises a support portion fixed to the body frames to extend outward in the vehicle width direction and above the rear side cover, a grip supported by the support portion to extend rearwardly of the fellow passenger seat and grasped by the fellow passenger, and a protective bar portion of a cantilevered structure supported by a portion of the support portion positioned above the rear side cover to extend toward the front of a vehicle and above the rear side cover to protect the rear side cover.

In accordance with an embodiment of the present invention, it may be possible to prevent damage to a rear side cover. Also, since the protective bar portion is of a cantilevered structure, it is possible to protect the rear side cover without considerably modifying the construction of general rear side covers, body frames, or the like. For example, it may be possible to support the protective bar portion without the provision of any bracket or the like, which supports a tip end of the protective bar portion, on the body frame.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

Figure 1:
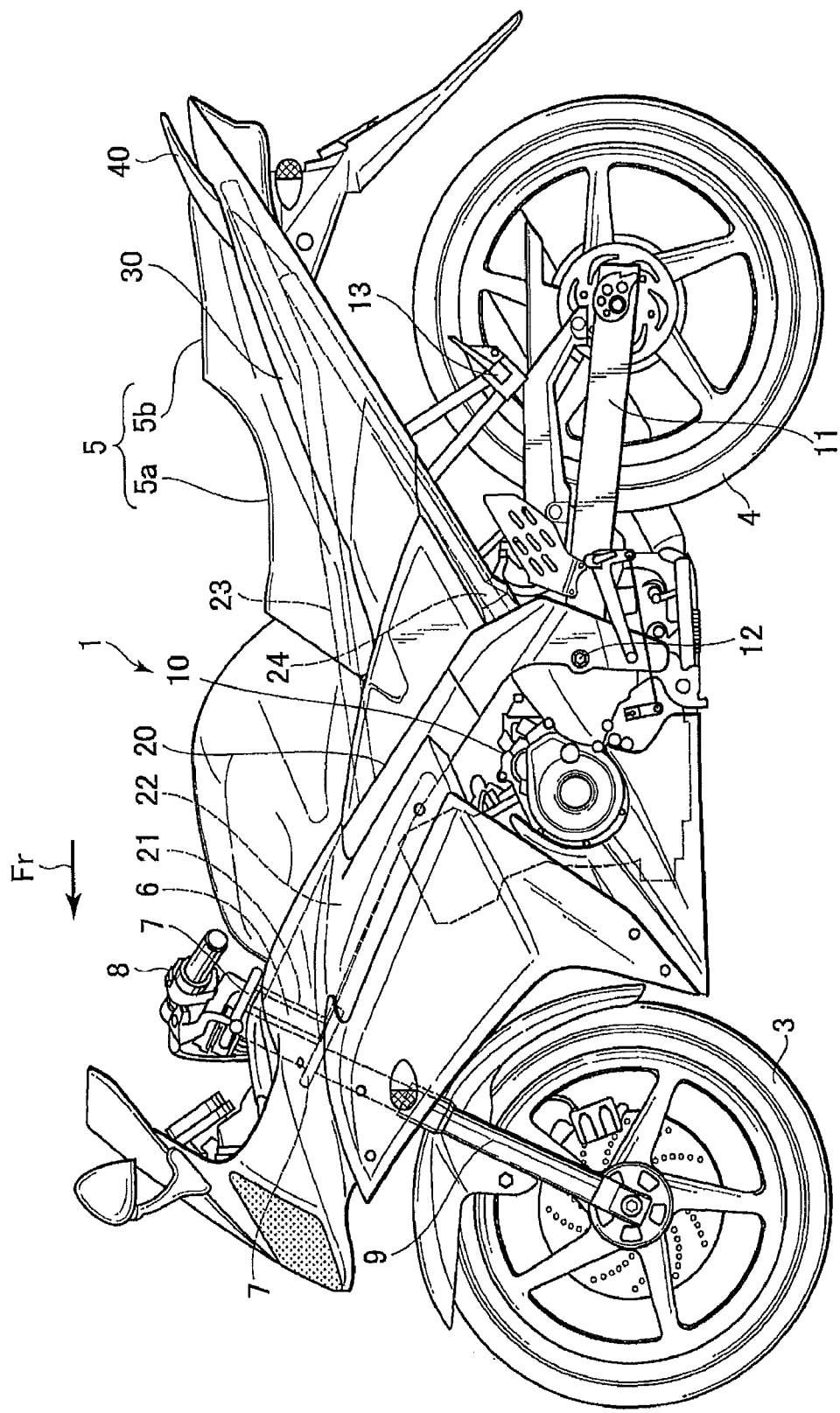
FIG. 1 is a side view showing a motorcycle in accordance with an embodiment of the invention.

The description of various reference numerals and symbols in the drawings may be set forth in accordance with one or more embodiments, for example, as follows: 1: motorcycle, 3: front wheel, 4: rear wheel, 5: seat, 6: steering shaft, 7: bracket, 8: handle, 9: front fork, 10: engine, 11: rear arm, 12: pivot shaft, 13: footrest for fellow passenger, 20: body frame, 21: head pipe, 22: main frame, 23: seat rail, 24: back stay, 30: rear side cover, 31: tail cowl, 40: glove bar, 41: support portion, 42: grip, 43: protective bar portion, 44: bolt, and 45: nut.

Embodiments of the present invention and their advantages are best understood by referring to the detailed description that follows. It should be appreciated that like reference numerals are used to identify like elements illustrated in one or more of the figures.

DETAILED DESCRIPTION

Figure 2:
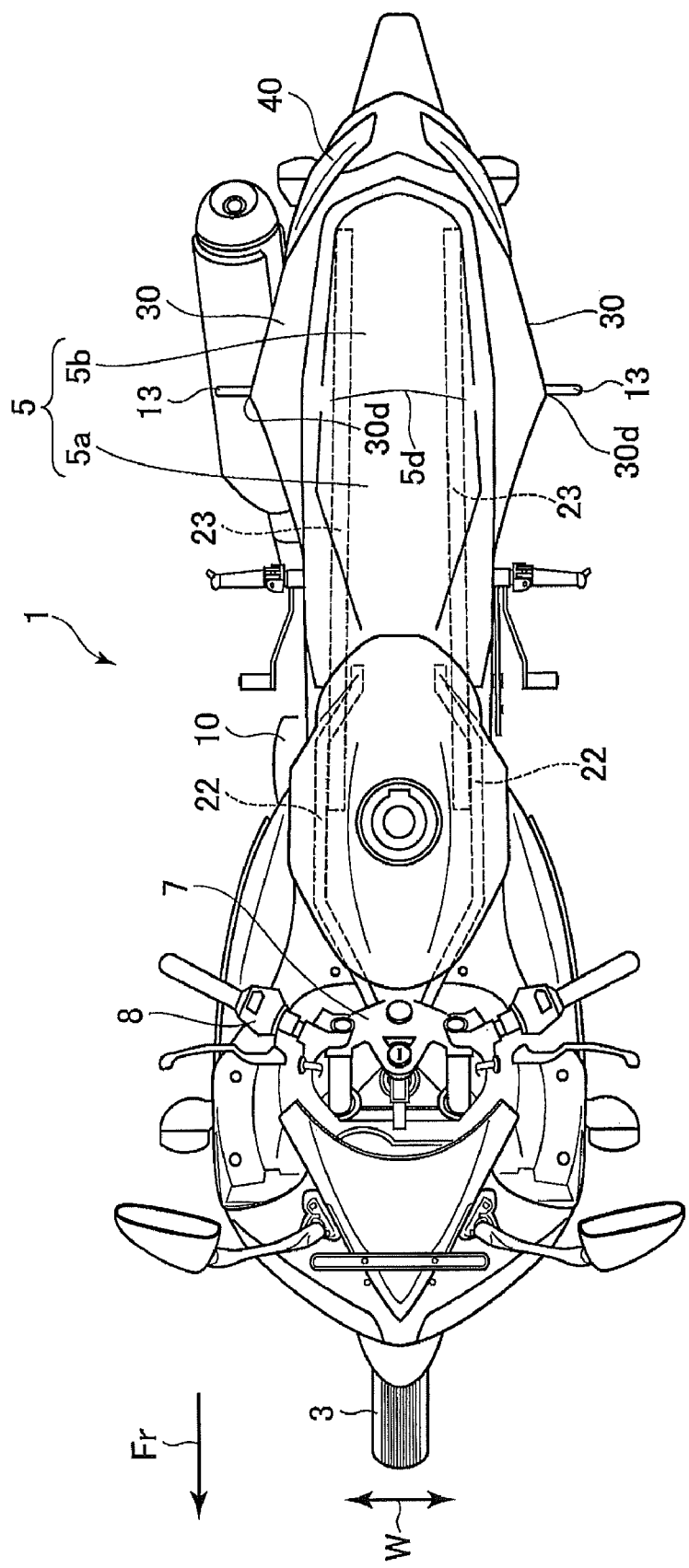
FIG. 2 is a plan view showing the motorcycle in accordance with an embodiment of the invention.
Figure 3:
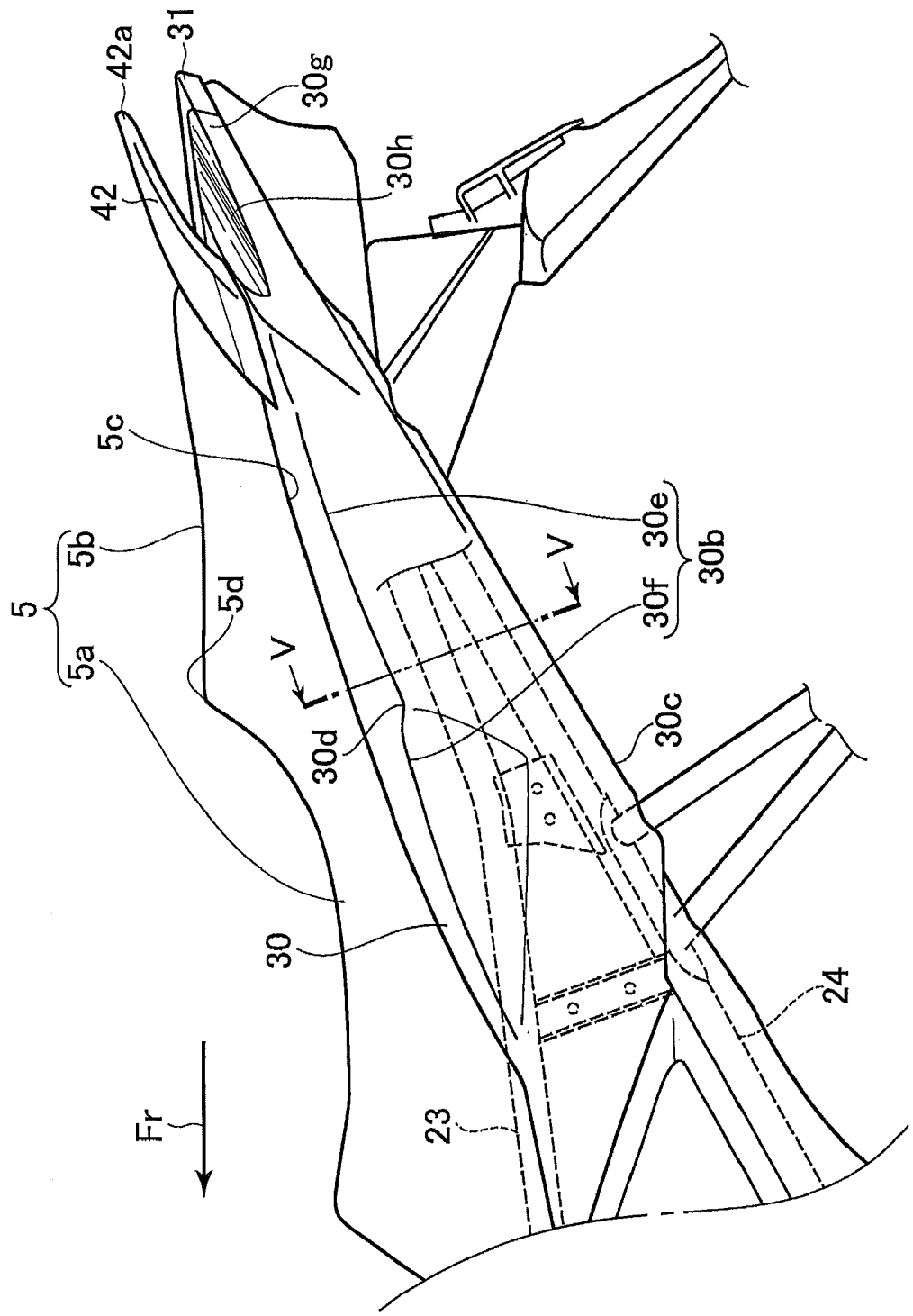
FIG. 3 is a side view showing a rear portion of the motorcycle in accordance with an embodiment of the invention.
Figure 4:
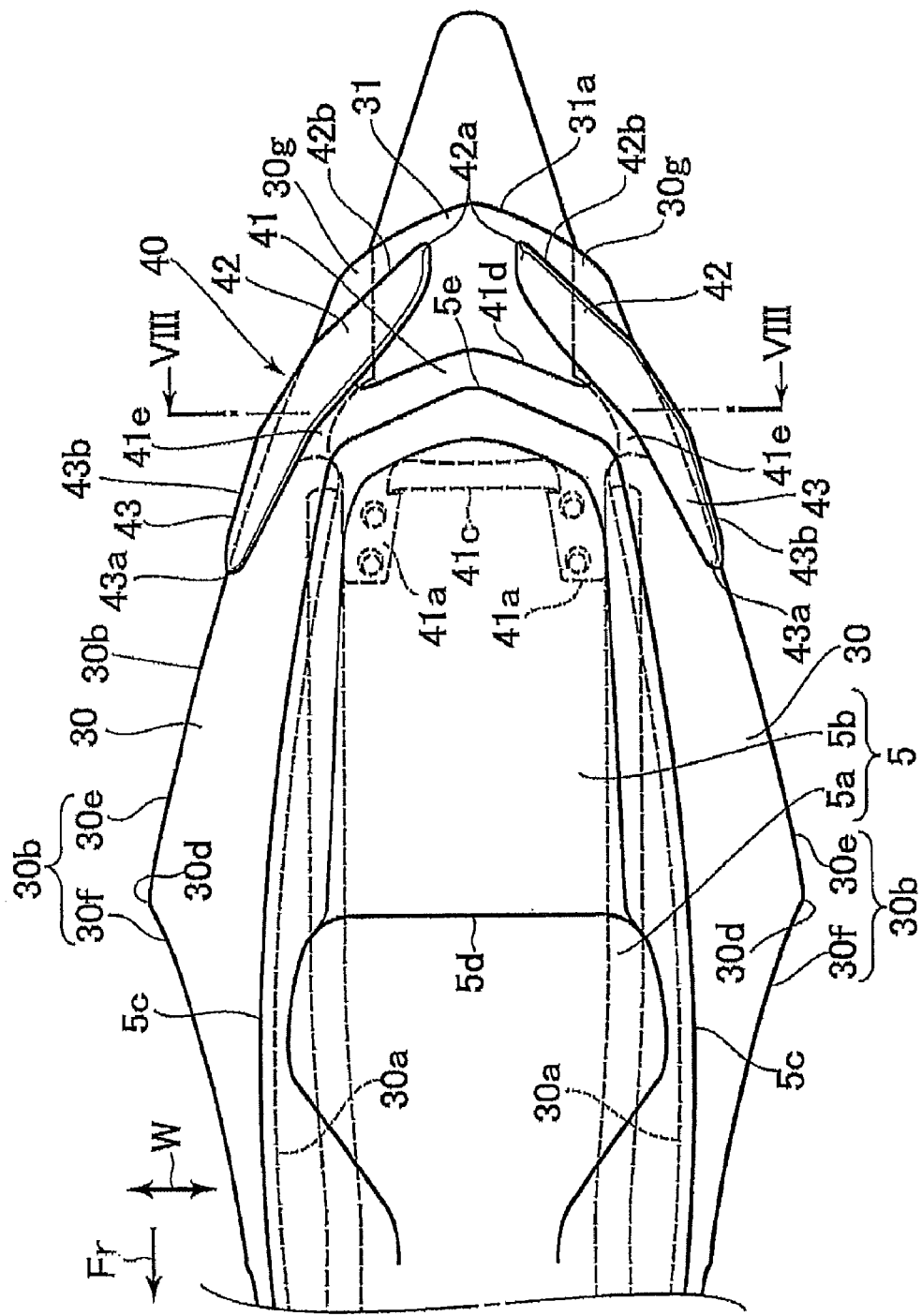
FIG. 4 is a plan view showing the rear portion of the motorcycle in accordance with an embodiment of the invention.

FIG. 1 is a side view showing a motorcycle 1 and FIG. 2 is a plan view showing the motorcycle 1 in accordance with one or more embodiments of the present invention. Furthermore, FIG. 3 is a side view showing a rear portion of the motorcycle 1 and FIG. 4 is a plan view showing the rear portion of the motorcycle 1 in accordance with one or more embodiments of the present invention.

As shown in FIG. 1 or 2, the motorcycle 1 comprises a front wheel 3, a rear wheel 4, a seat 5, an engine 10, a body frame 20, a glove bar 40, and a pair of left and right, rear side covers 30, 30. Also, the body frame 20 comprises a head pipe 21, a pair of left and right, main frames 22, 22, and a pair of left and right seat rails 23, 23. Further, the body frame 20 comprises a left, back stay 24 and a right, back stay (not shown but on the right side opposite left back stay 24, with FIG. 1 or 3 showing only the back stay 24 on the left in a vehicle (motorcycle) traveling direction, e.g., a forward direction indicated by Fr in the figures).

As shown in FIG. 1, the head pipe 21 is arranged at a front end of the body frame 20 to support a steering shaft 6 rotatably. An upper portion of the steering shaft 6 is connected to a handle 8, which is arranged to extend in a vehicle width direction (direction indicated by W in FIG. 2 or 4) to change a direction of the front wheel 3, through two brackets 7, 7 aligned vertically. A front fork 9 is connected to a lower portion of the steering shaft 6. An axle shaft of the front wheel 3 is supported by the front fork 9.

Front ends of the main frames 22, 22 are connected to the head pipe 21. As shown in FIG. 2, the main frames 22, 22 extend rearward (an opposite direction to a direction indicated by Fr in FIGS. 1 to 4) from front ends thereof and spread outward in the vehicle width direction. Also, as shown in FIG. 1, the main frames 22 extend obliquely downward toward the rear of a vehicle body and are bent downward midway thereof. Front ends of the seat rails 23 are connected to the main frames 22 and the seat rails 23 extend obliquely upward toward the rear of a vehicle body from the front ends to support the seat 5 arranged thereabove. Front ends of the back stays 24, respectively, are connected to the main frames 22. Positions, in which the back stays 24 and the main frames 22 are connected to each other, are lower than those, in which the seat rails 23 and the main frames 22 are connected to each other, and the back stays 24 extend obliquely upward toward the rear of a vehicle body from the positions of connection. Rear ends of the back stays 24 are connected to the seat rails 23.

As shown in FIG. 1, the engine 10 is arranged below the main frames 22 and suspended by the main frame 22. The rear wheel 4 is arranged on the rear of a vehicle body and positioned below the seat 5. Also, the rear wheel 4 is supported by a rear arm 11, which is arranged to extend in a longitudinal direction. A front end of the rear arm 11 is mounted to a pivot shaft 12 supported by the main frames 22, so that the rear wheel 4 swings vertically about the pivot shaft 12 according to road surface irregularities. A driving force output from the engine 10 is transmitted to the rear wheel 4 through a chain (not shown).

The seat 5 is a so-called double seat to include a front seat 5a for a driver who operates the handle 8, etc. and a rear seat 5b for a fellow passenger who is present behind the driver to ride the motorcycle 1. The front seat 5a and the rear seat 5b are contiguous to each other in a state of being aligned in a longitudinal direction. Also, the rear seat 5b is provided in a higher position than that of the front seat 5a.

Figure 5:
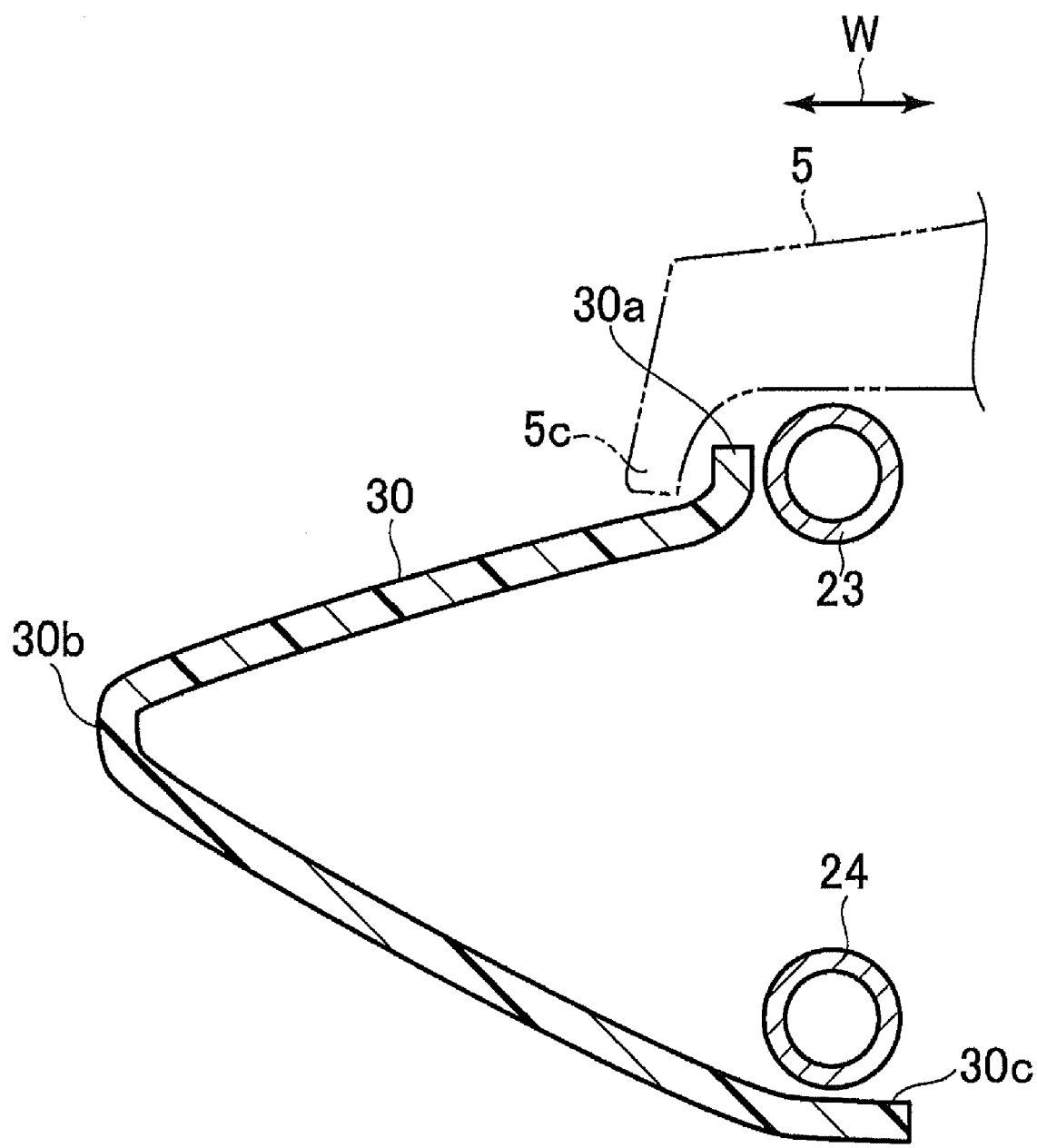
FIG. 5 is a cross sectional view showing a seat rail, a back stay, and a rear side cover and taken along the line V-V in FIG. 3 in accordance with an embodiment of the invention.

An explanation will be given next directed to the rear side covers 30, 30. FIG. 5 is a cross sectional view showing the rear side cover 30, the seat rail 23, and the back stay 24 and taken along the line V-V in FIG. 3. In addition, since the rear side cover 30 provided on the left of a vehicle body and the rear side cover 30 provided on the right of a vehicle body are interposed therebetween by a center line passing through a center of a vehicle body and are constructed in bilateral symmetry, an explanation will be given taking, as an example, the rear side cover 30 on the left.

As shown in FIG. 3, the rear side cover 30 is provided below the seat 5 to adjoin the seat 5 as viewed from laterally of a vehicle. The rear side cover 30 extends longitudinally along the seat rail 23 and the back stay 24 outwardly of the seat rail 23 and the back stay 24 in the vehicle width direction. The rear side cover 30 covers the seat rail 23 and the back stay 24 from outward in the vehicle width direction. The rear side cover 30 is formed from, for example, a resin. Also, the rear side cover 30 is mounted to, for example, the seat rails 23 and supported by the seat rails 23 outwardly thereof.

Also, as shown in FIG. 5, the rear side cover 30 is shaped to project outward in the vehicle width direction from an edge 5c of the seat 5 in the vehicle width direction. That is, an upper edge 30a of the rear side cover 30 is positioned between the edge 5c of the seat 5 and the seat rails 23. The rear side cover 30 extends outward in the vehicle width direction from the upper edge 30a and is bent at an edge 30b to be directed toward a center in the vehicle width direction. The lower edge 30c of the rear side cover 30 is positioned below the back stays 24.

Also, as shown in FIG. 4, a rear edge 30e, positioned on the rear of a vehicle body, out of the edge 30b is positioned outwardly of the rear seat 5b in the vehicle width direction. A distance between the rear edge 30e and the edge 5c of the rear seat 5b increases as it goes forward and a front end 30d of the rear edge 30e is positioned most away from the edge 5c. The front end 30d is positioned outwardly of a front end 5d of the rear seat 5b in the vehicle width direction. Also, as shown in FIG. 2, a footrest 13, on which a fellow passenger seated on the rear seat 5b puts a foot, is provided below the front end 30d. A front edge 30f, positioned on the front of a vehicle body, out of the edge 30b extends from the front end 30d toward the front of a vehicle body and toward a center in the vehicle width direction.

As shown in FIG. 4, the left and right, rear side covers 30, 30, respectively, extend rearward beyond a rear edge 5e of the seat 5. A tail cowl 31 positioned rearwardly of the seat 5 bridges between rear ends 30g, 30g of the rear side covers 30, 30. An outer surface of the tail cowl 31 is made smoothly contiguous to outer surfaces of the rear ends 30g without the generation of steps between it and outer surfaces of the rear side covers 30.

Figure 6:
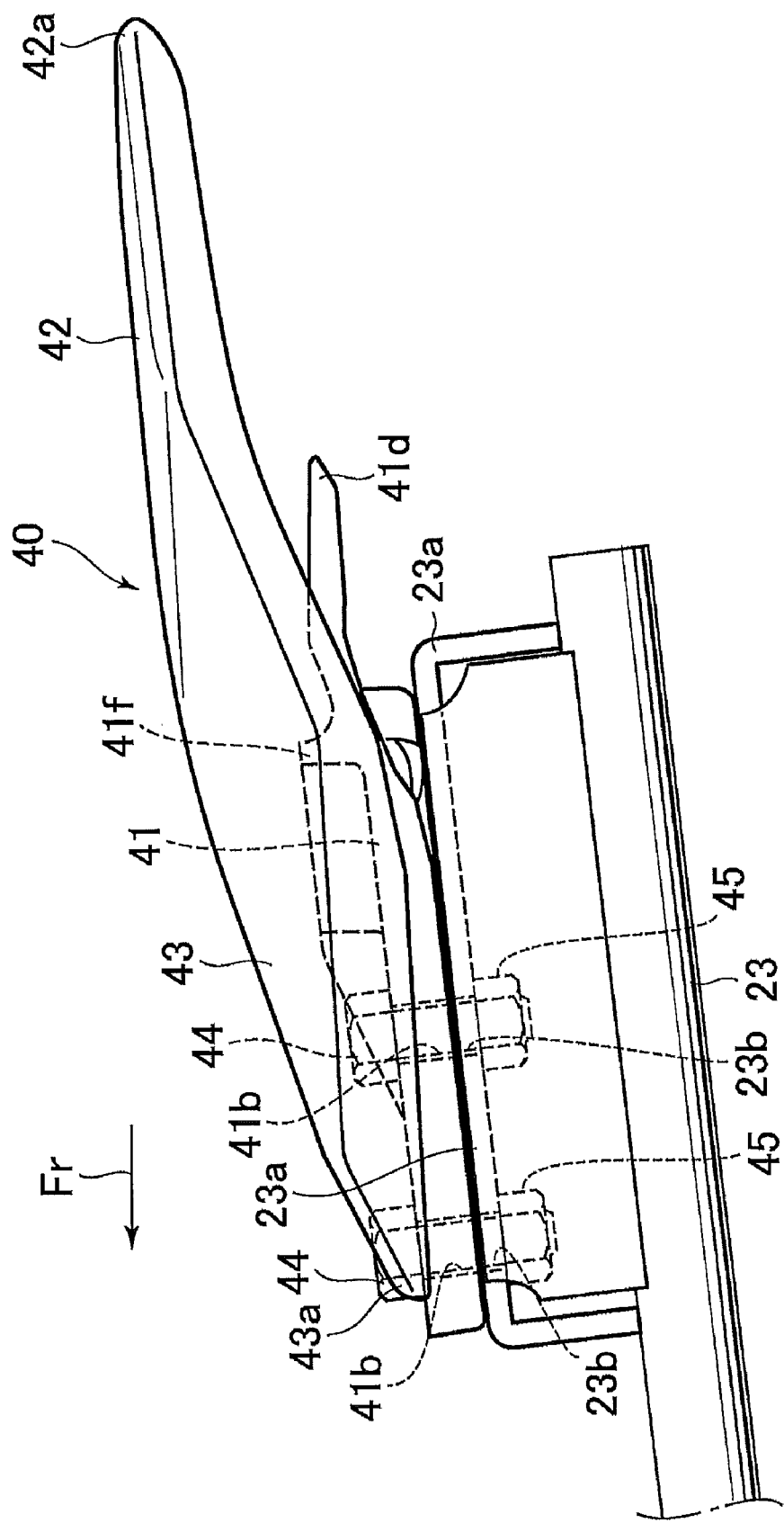
FIG. 6 is a side view showing a glove bar mounted to seat rails in accordance with an embodiment of the invention.
Figure 7:
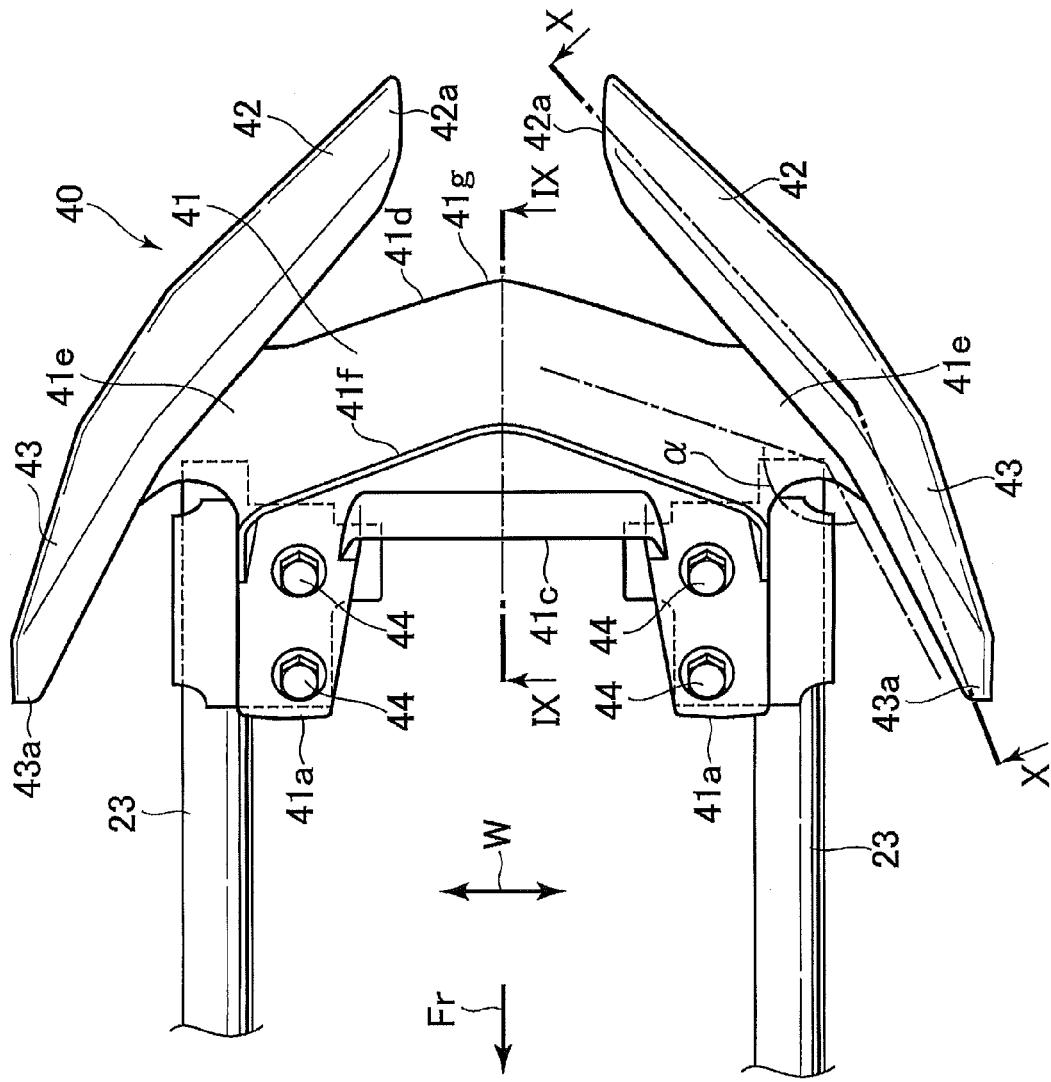
FIG. 7 is a plan view showing the glove bar mounted to the seat rails in accordance with an embodiment of the invention.
Figure 8:
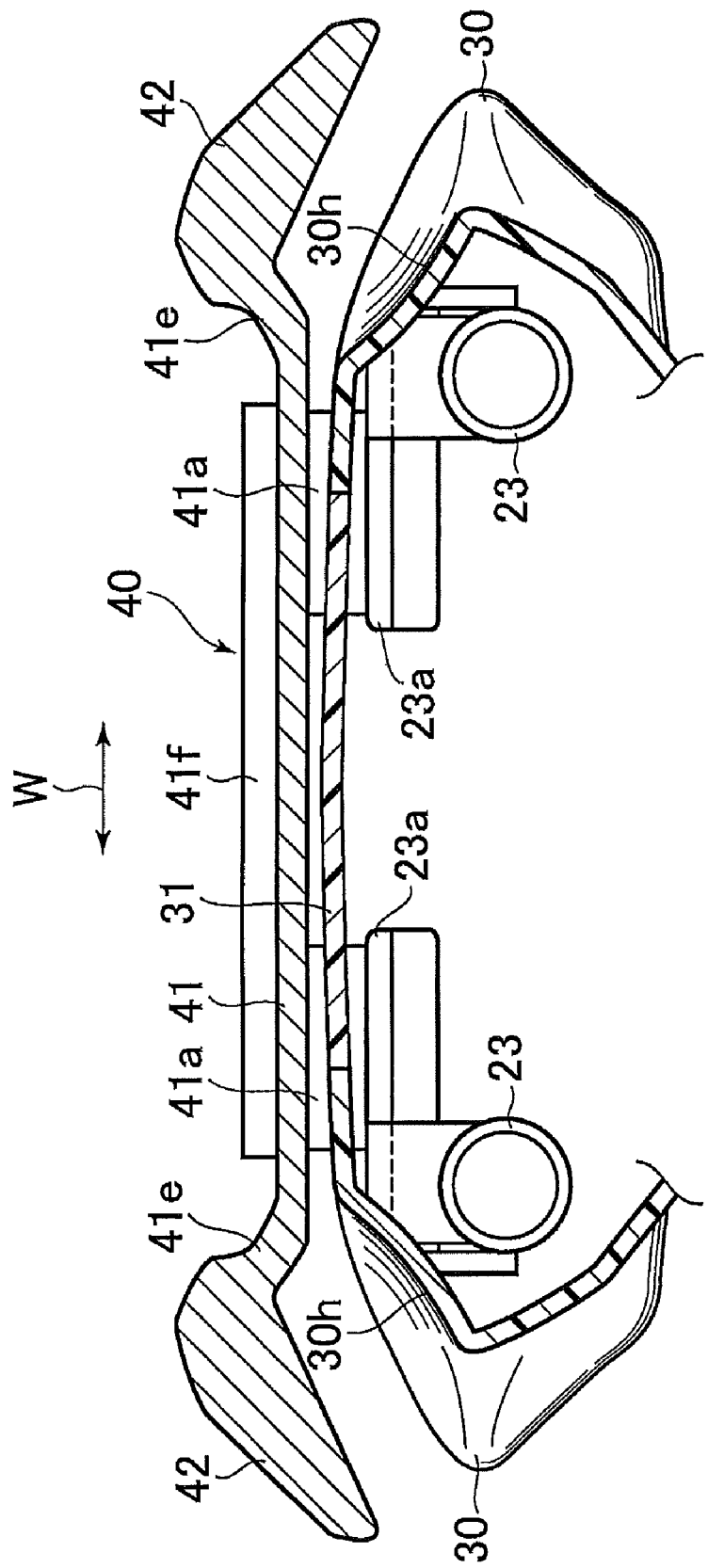
FIG. 8 is a cross sectional view taken along the line VIII-VIII in FIG. 4 in accordance with an embodiment of the invention.

An explanation will be given next directed to the glove bar 40. FIG. 6 is a side view showing the glove bar 40 mounted to the seat rails 23, 23 and FIG. 7 is a plan view showing the glove bar 40 mounted to the seat rails 23, 23. Also, FIG. 8 is a cross sectional view taken along the line VIII-VIII in FIG. 4, FIG. 9 is a cross sectional view showing the glove bar 40 and taken along the line IX-IX in FIG. 7, and FIG. 10 is a cross sectional view showing the glove bar 40 and taken along the line X-X in FIG. 7.

The glove bar 40 is grasped by a fellow passenger seated on the rear seat 5b and thus, the fellow passenger may be made stable in a ride posture. As shown in FIG. 7, the glove bar 40 has a shape of bilateral symmetry interposed therebetween by a center line passing through a center of a vehicle body and includes a support portion 41, a pair of left and right grips 42, 42, and a pair of left and right protective bar portions 43, 43. The support portion 41, the grips 42, 42, and the protective bar portions 43, 43 are molded integrally.

As shown in FIG. 7, the support portion 41 is fixed to the left and right seat rails 23, 23, respectively. In an example illustrated herein, the support portion 41 includes a pair of left and right fixed portions 41a, 41a positioned below the rear seat 5b (see FIG. 4). The right fixed portion 41a is fixed to the right seat rail 23 by two bolts 44, 44 and the left fixed portion 41a is fixed to the left seat rail 23 by two bolts 44, 44.

Figure 9:
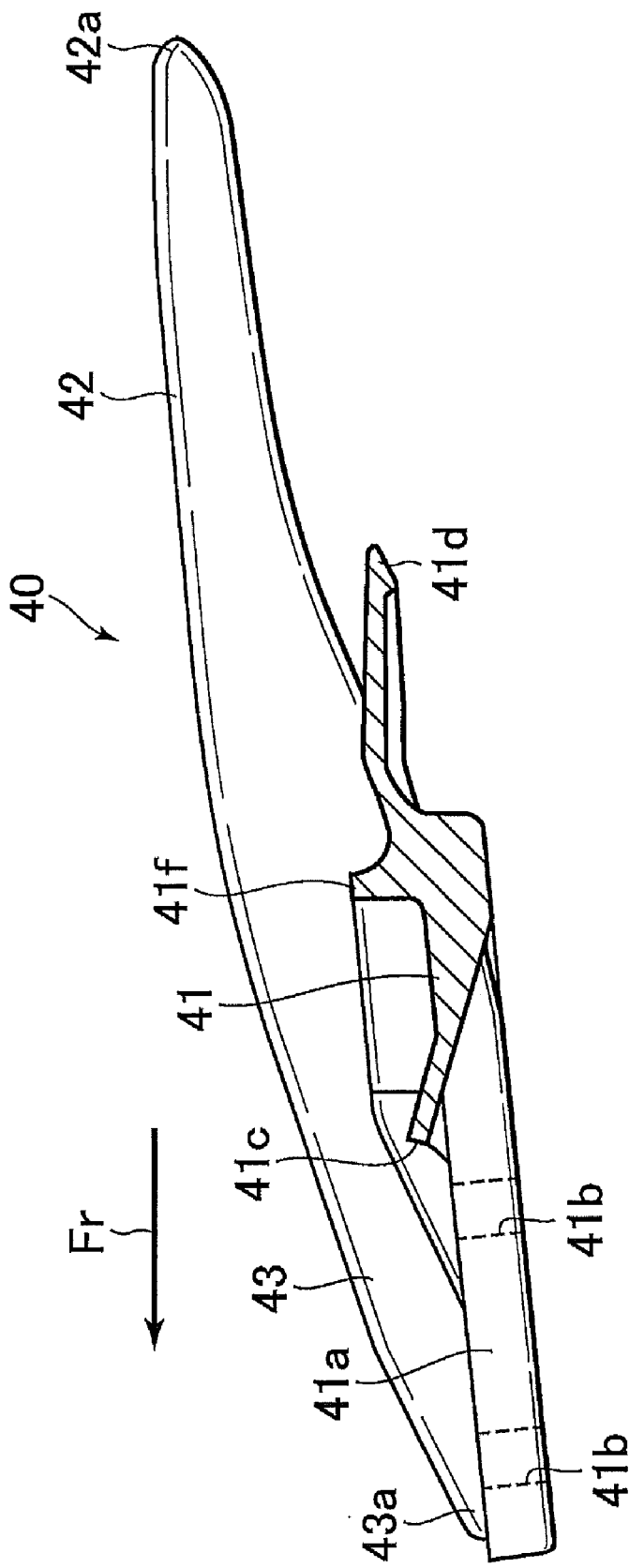
FIG. 9 is a cross sectional view taken along the line IX-IX in FIG. 7 in accordance with an embodiment of the invention.
Figure 10:
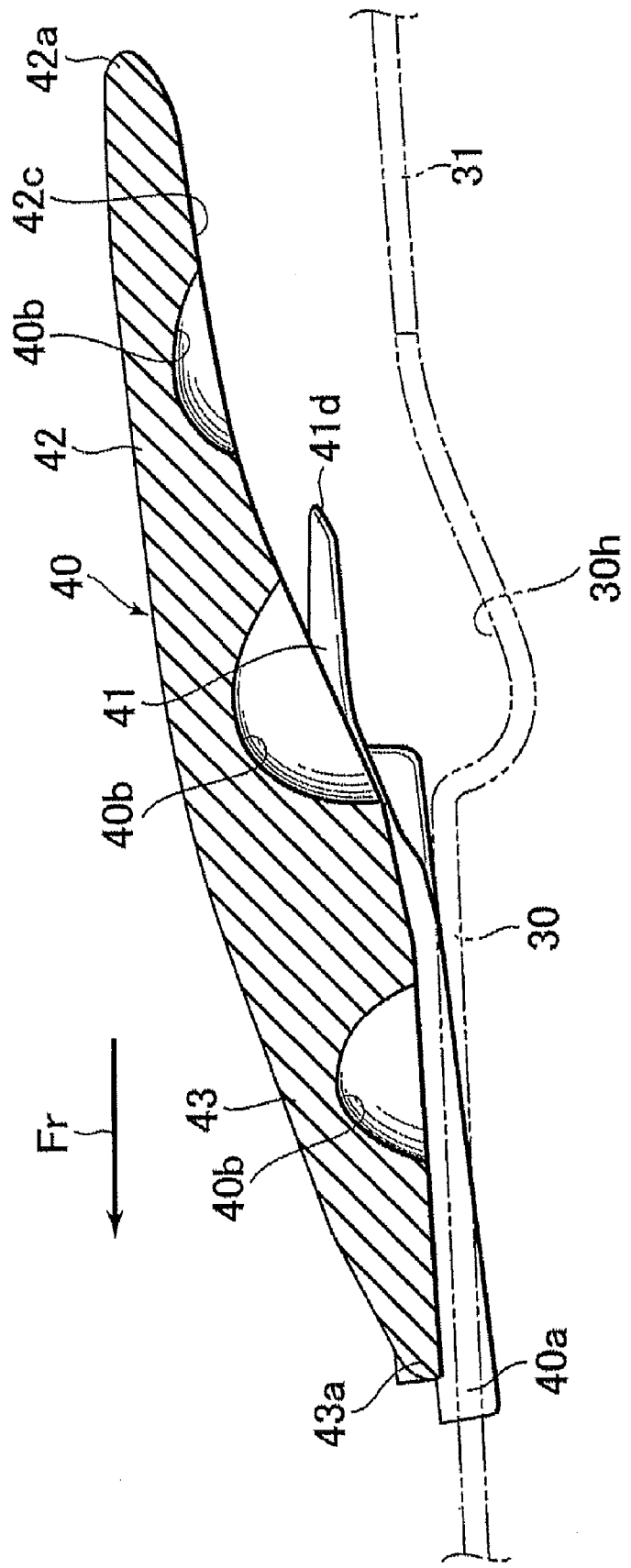
FIG. 10 is a cross sectional view taken along the line X-X in FIG. 7 in accordance with an embodiment of the invention.

As shown in FIG. 6, 7, or 9, the fixed portions 41a are plate-shaped to extend forward from the support portion 41. The fixed portions 41a, respectively, are formed with two mount holes 41b, 41b. Plate-shaped brackets 23a, 23a having surfaces in parallel to a direction, in which the seat rails 23, 23 extend, are joined to outer peripheral surfaces of the seat rails 23, 23. The brackets 23a, respectively, are formed with two mount holes 23b, 23b. The bolts 44, 44 are inserted through the mount holes 23b, 23b and the mount holes 41b, 41b of the fixed portion 41a. In addition, nuts 45, 45 are provided on the back side of the mount holes 23b, 23b, the nuts 45, 45 being clamped to the bolts 44, 44 on the back side of the mount holes 23b, 23b (see FIG. 6).

As shown in FIG. 7, the support portion 41 is plate-shaped and arranged to extend outward (left and right directions) in the vehicle width direction from a center 41g in a width direction. As shown in FIG. 4, a front edge 41c of the support portion 41 is positioned below the rear seat 5b. A rear edge 41d of the support portion 41 is positioned rearwardly of the rear seat 5b.

As shown in FIG. 8, the support portion 41 extends outward from a center of the vehicle body with ends 41e, 41e thereof above the rear side covers 30, 30. Also, the ends 41e, 41e are bent upward above the rear side covers 30, 30.

As shown in FIGS. 7 and 9, a projection 41f projecting upward (toward an underside of the seat 5) and extending in the vehicle width direction is formed between the rear edge 41d and the front edge 41c of the support portion 41. The projection 41f is positioned inwardly (forwardly) of the rear edge 5e of the seat 5 to prevent water, etc. from entering below the seat 5. Also, as shown in FIG. 9, the front edge 41c of the support portion 41 is inclined upward.

The grips 42, 42 are rod-shaped and grasped by a fellow passenger seated on the rear seat 5b. As shown in FIG. 4 or 7, the grips 42, 42 are provided on the both ends 41e, 41e of the support portion 41 to extend rearwardly of the both ends 41e, 41e on the rear side of the rear seat 5b. Also, in an example described here, the grips 42, 42 extend rearward in a state of being inclined toward a center in the vehicle width direction from positions above the rear side cover 30. Rear ends 42a, 42a thereof are separated from each other in the vehicle width direction. Also, as shown in FIG. 4, edges 42b, 42b of the grips 42 in the vehicle width direction are positioned inwardly (forwardly) of an edge 31a of the tail cowl 31 as viewed in plan view of a vehicle body.

Also, as shown in FIG. 6 or 10, the grips 42 are inclined so that the rear ends 42a, 42a thereof are higher than a front side thereof and a distance between lower surfaces 42c of the grips 42, and an upper surface of the rear side cover 30 and an upper surface of the tail cowl 31 increases as it goes rearward. Also, as shown in FIG. 3 or 8, dent portions 30h dented inward (toward the seat rails 23) are formed on portions of the rear side cover 30 positioned below the grips 42. As shown in FIG. 3, the dent portions 30h extend longitudinally below the grips 42. Therefore, gaps, into which a fellow passenger may insert hands (e.g., fingers) when grasping the glove bar 40, are ensured between the upper surface of the rear side cover 30 or of the tail cowl 31 and the lower surfaces 42c of the grips 42, 42.

As shown in FIG. 4, 7, or 10, the protective bar portions 43, 43 extend forward above the rear side cover 30 from the ends 41e, 41e of the support portion 41 positioned above the rear side cover 30 to protect the rear side cover 30.

As shown in FIG. 10, the protective bar portions 43 extend forward along the upper surface of the rear side cover 30 in positions spaced slightly upward from the upper surface and front ends 43a thereof are positioned outwardly of the rear seat 5b in the vehicle width direction (see FIG. 4). Also, the protective bar portions 43 are slightly inclined so that the front ends 43a are close to the upper surface of the rear side cover 30 as compared with rear portions (toward the ends 41e of the support portion 41). Also, as shown in FIG. 4, edges 43b, 43b of the protective bar portions 43, 43 in the vehicle width direction are positioned outwardly of the rear edge 30e of the rear side cover 30 in the vehicle width direction as viewed in plan view of a vehicle body.

Also, as shown in FIG. 7, the protective bar portions 43 extend toward the front of a vehicle in a state of being inclined outward in the vehicle width direction. Also, the support portion 41 extends outwardly of the center 41g in the vehicle width direction in a state of being inclined toward the front of a vehicle. Therefore, an angle formed between a direction, in which the support portion 41 extends, and a direction, in which the protective bar portions 43 extend, is an obtuse angle a as viewed in plan view of a vehicle body.

The protective bar portions 43, 43 are supported in a cantilevered manner by the ends 41e, 41e of the support portion 41. That is, bases of the protective bar portions 43, 43 are supported on the ends 41e, 41e of the support portion 41 and front ends and intermediate portions of the protective bar portions 43, 43 are not fixed to a member, such as the seat rails 23, the rear side cover 30, etc., positioned therearound.

In addition, as shown in FIG. 10, a plurality (here, for example, three) of recesses 40b opened downward (toward the upper surface of the rear side cover 30) are formed on the protective bar portion 43 and the grip 42.

As described above in accordance with one or more embodiments, the motorcycle 1 comprises the pair of seat rails 23, 23 extending longitudinally of a vehicle, the seat 5, for fellow passengers, arranged on the pair of seat rails 23, 23, the rear side covers 30, 30 that cover the seat rails 23, 23 from outward in the vehicle width direction, and the glove bar 40 fixed to the seat rails 23, 23 and grasped by a fellow passenger seated on the seat 5. The glove bar 40 comprises the support portion 41 fixed to the seat rails 23 to extend outward in the vehicle width direction and above the rear side covers 30, the grips 42 supported by the support portion 41 to extend rearwardly of the seat 5 and grasped by a fellow passenger, and the protective bar portions 43 of a cantilevered structure supported by the ends 41e of the support portion 41 positioned above the rear side cover 30 and extending toward the front of a vehicle and above the rear side covers 30 to protect the rear side covers 30.

Accordingly as an example, it may be possible to prevent damage to the rear side covers 30. Also, since the protective bar portions 43 are of a cantilevered structure, it may be possible to protect the rear side covers without considerably modifying the construction of general rear side covers, seat rails, or the like. For example, it may be possible to protect the protective bar portions 43 without the provision of any bracket or the like, which supports the front ends 43a of the protective bar portions 43, on the seat rails 23.

Also in accordance with an embodiment, with the motorcycle 1, the protective bar portions 43, respectively, are provided on the left and right ends 41e, 41e of the support portion 41. Therefore, it may be possible to prevent damage to the left and right, rear side covers 30.

Also in accordance with an embodiment, with the motorcycle 1, the support portion 41 extends outward in the vehicle width direction and is inclined toward the front of a vehicle and the protective bar portions 43 extend forward from the ends 41e of the support portion 41 and are inclined outward in the vehicle width direction. Therefore, it may be possible to increase that strength, with which the protective bar portions 43 are supported, as compared with the case where a direction, in which the support portion 41 extends, and a direction, in which the protective bar portions 43 extend, forms an acute angle therebetween.

Also in accordance with an embodiment, with the motorcycle 1, the grips 42, respectively, are provided on the left and right of a vehicle body. Therefore, a fellow passenger can grasp the glove bar 40 with both hands, so that it may be possible to make the fellow passenger stable in posture.

Also in accordance with an embodiment, with the motorcycle 1, the grips 42, respectively, are provided on the left and right of a vehicle body and the rear ends 42a, 42a of the left and right grips 42, 42 are away from each other. Therefore, it may be possible to make a fellow passenger further stable in posture while making the glove bar 40 light in weight.

Also in accordance with an embodiment, with the motorcycle 1, the left and right grips 42, 42 extend rearward from the support portion 41 and, respectively, are inclined toward the center in the vehicle width direction. Therefore, a fellow passenger may easily grasp the grips 42, 42.

Also in accordance with an embodiment, with the motorcycle 1, the edges 43b of the protective bar portions 43 in the vehicle width direction are positioned outwardly of the rear edge 30e of the rear side cover 30 in the vehicle width direction. Therefore, it may be possible to further effectively protect the rear side cover 30.

Also in accordance with an embodiment, with the motorcycle 1, the dent portions 30h are formed on the portions of the rear side cover 30 positioned below the grips 42. Therefore, a fellow passenger may easily grasp the grips 42, 42.

Also in accordance with an embodiment, with the motorcycle 1, the rear side cover 30 may be formed from a resin. Therefore, it may be possible to reduce the weight of the motorcycle 1.

In addition, it should be understood that the invention is not limited to the motorcycle 1 described above but rather is susceptible to various modifications that fall within the scope of the present invention. For example in accordance with an embodiment, with the motorcycle 1 described above, the protective bar portions 43 extend forward from the ends 41e of the support portion 41. However, the protective bar portions 43 may extend forward from an intermediate portion of the support portion 41.

Also in accordance with an embodiment, with the motorcycle 1, the grips 42 extend rearward from the ends 41e of the support portion 41. However, the grips 42 may extend rearward from an intermediate portion of the support portion 41.

Also in accordance with an embodiment, with the motorcycle 1, the brackets 23a, 23a are provided on the seat rails 23, 23, respectively, and the fixed portions 41a, 41a are mounted to the respective brackets 23a, 23a. However, a single bracket and a single fixed portion will do and may be substituted in accordance with an embodiment. For example, a bracket may bridge between a pair of seat rails 23, 23 and a single fixed portion provided on the support portion 41 may be mounted to the bracket.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A motorcycle comprising:
a pair of body frames extending in a longitudinal direction of the motorcycle,
a fellow passenger seat arranged on the pair of body frames,
a rear side cover that covers either of the body frames from outward in a motorcycle width direction, and
a glove bar fixed to at least one of the body frames and configured to be grasped by a fellow passenger seated on the fellow passenger seat, and
wherein the glove bar comprises:
a support portion fixed to the body frames to extend outward in the motorcycle width direction and above the rear side cover,
a grip supported by the support portion to extend rearwardly of the fellow passenger seat and configured to be grasped by the fellow passenger, wherein a dent is formed below the grip on the rear side cover, and wherein a rear portion of the grip extends upward rearward, with the dent formed opposite to the rear portion of the grip, and
a protective bar portion of a cantilevered structure supported by a portion of the support portion positioned above the rear side cover to extend toward the front of the motorcycle and above the rear side cover to protect the rear side cover.

2. The motorcycle according to claim 1, wherein the protective bar portion is provided at both left and right ends of the support portion, respectively.

3. The motorcycle according to claim 1, wherein the support portion extends outward in the motorcycle width direction and is inclined toward the front of the motorcycle, and
the protective bar portion extends forwardly of an end of the support portion and is inclined outwardly in the motorcycle width direction.

4. The motorcycle according to claim 1, wherein the grip is provided on the left and right of the support portion.

5. The motorcycle according to claim 4, wherein rear ends of the left and right grips are separated from each other.

6. The motorcycle according to claim 5, wherein the left and right grips extend rearwardly of the support portion and are inclined toward a center in the motorcycle width direction.

7. The motorcycle according to claim 1, wherein outer edges of the protective bar portion in the motorcycle width direction are positioned outwardly of outer edges of the rear side cover in the motorcycle width direction.

8. The motorcycle according to claim 1, wherein the rear side cover is formed from a resin.

9. A motorcycle comprising:
a pair of body frames;
a fellow passenger seat arranged on the pair of body frames,
a rear side cover that extends outward in a motorcycle width direction and covers the body frames, and
a glove bar fixed to the body frames and configured to be grasped by a fellow passenger seated on the fellow passenger seat, and
wherein the glove bar comprises:
a support portion fixed to the body frames and which extends outward in the motorcycle width direction and above the rear side cover,
a grip supported by the support portion to extend rearwardly of the fellow passenger seat and configured to be grasped by the fellow passenger, wherein one or more dents are formed below the grip on the rear side cover, and wherein a rear portion of the grip extends upward rearward, with the one or more dents formed opposite to the rear portion of the grip, and
a protective bar portion of a cantilevered structure supported by a portion of the support portion positioned above the rear side cover to extend toward the front of the motorcycle and above the rear side cover to protect the rear side cover, wherein the protective bar portion is provided at both left and right ends of the support portion which extend outward in the motorcycle width direction.

10. The motorcycle according to claim 9, wherein the support portion extends outward in the motorcycle width direction and is inclined toward the front of the motorcycle, and
the protective bar portion extends forwardly of the ends of the support portion and is inclined outwardly in the motorcycle width direction.

11. The motorcycle according to claim 10, wherein the grip is provided on a left and right of the support portion, with rear ends of the left and right grips separated from each other, and wherein the left and right grips extend rearwardly of the support portion and are inclined toward a center in the motorcycle width direction.

12. The motorcycle according to claim 11, wherein outer edges of the protective bar portion in the motorcycle width direction are positioned outwardly of outer edges of the rear side cover in the motorcycle width direction.

13. The motorcycle according to claim 12, wherein the rear side cover is formed from a resin.

* * * * *